(12) United States Patent
Kawaguchi et al.

(10) Patent No.: US 6,694,956 B2
(45) Date of Patent: Feb. 24, 2004

(54) CONTROL SYSTEM FOR INTERNAL COMBUSTION ENGINE

(75) Inventors: Hiroshi Kawaguchi, Saitama-ken (JP); Hideo Moriwaki, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 183 days.

(21) Appl. No.: 10/059,355

(22) Filed: Jan. 31, 2002

(65) Prior Publication Data

US 2002/0139357 A1 Oct. 3, 2002

(30) Foreign Application Priority Data

Feb. 21, 2001 (JP) ........................................ 2001-045656

(51) Int. Cl.$^7$ ............................................... F02B 47/08
(52) U.S. Cl. .................. 123/568.21; 123/325
(58) Field of Search ........................ 123/568.21, 568.11, 123/568.22, 325

(56) References Cited

U.S. PATENT DOCUMENTS 4,718,385 A * 1/1988 Konrath ...................... 123/449
5,619,973 A * 4/1997 Hara et al. ................... 123/520
5,832,896 A * 11/1998 Phipps ......................... 123/352

* cited by examiner

*Primary Examiner*—Bibhu Mohanty
(74) *Attorney, Agent, or Firm*—Arent Fox Kintner Plotkin & Kahn, PLLC

(57) ABSTRACT

There is provided a control system for an internal combustion engine, which is capable of properly controlling the amount of exhaust gas recirculation according to a degree of flow rate degradation of an exhaust gas recirculation system and at the same time suppressing progress of the flow rate degradation. The control system has an exhaust gas recirculation system including an exhaust gas recirculation passage for communicating between an exhaust passage and an intake passage, and an exhaust gas recirculation valve for controlling the rate of exhaust gas recirculation to the intake passage via the exhaust gas recirculation passage according to the operation amount of the valve. An ECU cuts off supply of fuel to the engine during deceleration of the engine. An intake pipe absolute pressure sensor detects pressure within the intake passage. Further, the ECU sets an upper limit of the operation amount of the exhaust gas recirculation valve according to a change in the pressure within the intake passage detected when the exhaust gas recirculation valve is opened and closed during the cut-off of fuel supply.

16 Claims, 14 Drawing Sheets

F I G. 4
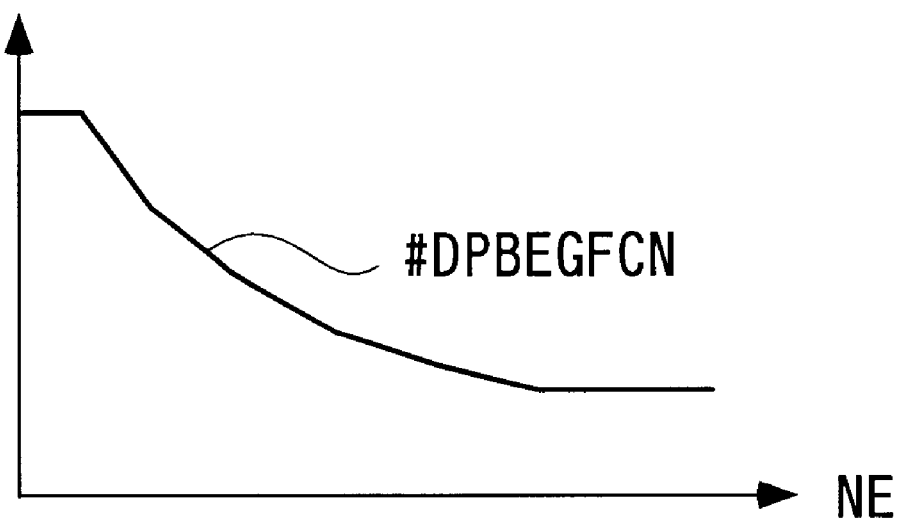

US 6,694,956 B2

CONTROL SYSTEM FOR INTERNAL COMBUSTION ENGINE

BACKGROUND OF THE INVENTION

1. Field of the Invention

This invention relates to a control system for an internal combustion engine, including an exhaust gas recirculation system for recirculating part of exhaust gases into an intake passage.

2. Description of the Prior Art

As is widely known, an exhaust gas recirculation system recirculates part of exhaust gases into an intake passage under predetermined operating conditions of an internal combustion engine, for reduction of NOx in the exhaust gases and improvement of fuel consumption. Accordingly, when the exhaust gas recirculation system is operated, carbon and hydrocarbons contained in the exhaust gases flow through an exhaust gas recirculation valve and a recirculation port, so that clogging or partial clogging of the valve and the port can be caused which is a major factor causing flow rate degradation or lowering of an exhaust gas recirculation system including the exhaust gas recirculation valve and the recirculation port. Conventionally, an apparatus for determining abnormality of the exhaust gas recirculation valve has been proposed e.g. in Japanese Laid-Open Patent Publication (Kokai) No. 7-180615. In the determining apparatus, the exhaust gas recirculation valve is opened when fuel supply is cut off during deceleration of the engine, and the intake pipe pressure is detected before and after the opening of the valve. If the amount of change in the intake pipe pressure occurring between before and after the opening is below a predetermined value, it is determined that the exhaust gas recirculation valve is in an abnormal condition. Further, in the determining apparatus, when it is determined that the abnormality of the valve has occurred, exhaust gas recirculation control is kept suspended until the cause of the abnormality is eliminated.

As described above, in the conventional abnormality-determining apparatus, whether the exhaust gas recirculation valve is normal or abnormal is determined by comparing the detected amount of change in intake pipe pressure between before and after the opening of the valve with the predetermined value. However, the intake pipe pressure is susceptible to influences of various factors, such as the pumping capacity (rotational speed, atmospheric pressure, amount of overlap between intake and exhaust valves, etc.) of the engine and an intake opening area (opening of a throttle valve opening of a secondary intake valve, and a master vac of a brake, etc.), and hence it is liable to variation. In particular, it is difficult to grasp the influences of the valve overlap amount and the master vac of the brake on the intake pipe absolute pressure, since there is no suitable means available for detecting them.

For this reason, in the conventional method of determining the abnormality based on simple comparison between the detected amount of change in the intake pipe pressure and the predetermined value, it is difficult to estimate a degree of flow rate degradation of the exhaust gas recirculation system e.g. due to (partial) clogging, which makes it inevitable to carry out rough determination, such as determination of whether the exhaust gas recirculation control valve is normal or abnormal. As a result, even when the ratio of fresh intake air to the whole intake air including the recirculated exhaust gases is increasing under an identical intake pipe pressure in a manner dependent on the progressively increasing degree of flow rate degradation of the exhaust gas recirculation system, the fuel supply control and ignition timing control continue to be carried out in the same manner as when the exhaust gas recirculation valve is normal until the valve is determined to be abnormal, so that the amount of fuel supply and the ignition timing deviate from respective optimum values all the while, which adversely affects exhaust emission characteristics and drivability. Further, since the exhaust gas recirculation valve is also held open to the same degree of opening as in the normal condition until the exhaust gas recirculation valve is determined to be abnormal, if the (partial) clogging of the port due to deposition of carbon and the like on a downstream side of the exhaust gas recirculation valve is responsible for the flow rate degradation, flow load in excess of exhaust gas recirculation capacity continues to be applied to part of the exhaust recirculation passage downstream of the valve. As a result, an increased pressure is applied to the part between the exhaust gas recirculation valve and the recirculation port downstream thereof, which accelerates deposition of carbon, resulting in acceleration of flow rate degradation of the exhaust gas recirculation system.

SUMMARY OF THE INVENTION

It is an object of the invention to provide a control system for an internal combustion engine, which is capable of properly controlling the exhaust gas recirculation rate in a manner responsive to flow rate degradation within an exhaust gas recirculation system and at the same time suppressing progress of the flow rate degradation.

To attain the above object, according to a first aspect of the present invention, there is provided a control system for an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve.

The control system according to the first aspect of the invention is characterized by comprising:

fuel supply cut-off means for cutting off supply of fuel to the engine during deceleration of the engine;

pressure-detecting means for detecting pressure within the intake passage; and operation amount-limiting means for setting an upper limit of the operation amount of the exhaust gas recirculation valve according to a change in the pressure within the intake passage detected when the exhaust gas recirculation valve is opened and closed during the cut-off of fuel supply.

According to this control system, the exhaust gas recirculation valve is opened and closed during cut-off of fuel supply during deceleration of the engine, and the upper limit of the operation amount of the exhaust gas recirculation valve is set according to a change in the pressure within the intake passage detected when the exhaust gas recirculation valve is opened and closed. The change in intake pipe pressure between before and after the opening or closing of the exhaust gas recirculation valve reflects the state of flow rate degradation of the exhaust gas recirculation system including the exhaust gas recirculation passage and the exhaust gas recirculation valve. Therefore, by setting the upper limit of the operation amount of the exhaust gas recirculation valve according to the change in the intake pipe pressure such that the rate of exhaust gas recirculation controlled by the exhaust gas recirculation valve is held within the recirculation capacity of the exhaust gas recirculation system, it is possible to prevent a flow load exceeding the recirculation capacity from being applied to the exhaust gas recirculation system. As a result, the deposition of carbon and the progress of flow rate degradation resulting therefrom can be suppressed. Further, even if flow rate degradation occurs, exhaust gas recirculation control can be carried out without being interrupted, and exhaust gases can be supplied to the intake passage at a limited rate without loss, so that it is possible to properly control the amount of fuel supply and the ignition timing by setting them according to the limited rate of exhaust gas recirculation.

Preferably, the control system further comprises flow rate degradation-estimating means for estimating a degree of flow rate degradation of the exhaust gas recirculation system based on the change in the pressure within the intake passage detected when the exhaust gas recirculation valve is opened and closed during the cut-off of fuel supply, and the operation amount-limiting means sets the upper limit of the operation amount of the exhaust gas recirculation valve according to the estimated degree of flow rate degradation of the exhaust gas recirculation system.

According to this preferred embodiment, the flow rate degradation-estimating means estimates a degree of flow rate degradation of the exhaust gas recirculation system based on the change in the pressure within the intake passage detected, and the operation amount-limiting means sets the upper limit of the operation amount of the exhaust gas recirculation valve according to the estimated degree of flow rate degradation. Therefore, since the exhaust gas recirculation rate is set according to the degree of flow rate degradation of the exhaust gas recirculation system, exhaust gas recirculation control can be executed to the maximum possible extent, which enables more appropriate control of the amount of fuel supply and the ignition timing.

Preferably, the control system further comprises operation delay-detecting means for detecting delay in operation of the exhaust gas recirculation valve, and fuel amount-correcting means for correcting an amount of fuel to be supplied to the engine when the exhaust gas recirculation valve is opened such that the amount of fuel is increased as the detected delay in operation of the exhaust gas recirculation valve is larger.

According to this preferred embodiment, delay in operation of the exhaust gas recirculation valve is detected, and when the exhaust gas recirculation valve is opened, the amount of fuel to be supplied to the engine is increased as the detected delay in operation of the value is larger. When the valve is opened, if delay in operation of the exhaust gas recirculation valve is large, the amount of fresh intake air increases with delay in supply of recirculated exhaust gases to cause leaning of the air-fuel mixture. In such a case, by increasing the amount of fuel as described above, it is possible to appropriately control the air-fuel ratio of the mixture supplied to the engine.

Preferably, the control system further comprises operation delay-detecting means for detecting delay in operation of the exhaust gas recirculation valve, and ignition timing-correcting means for correcting ignition timing of the engine when the exhaust gas recirculation valve is opened such that the ignition timing is retarded as the detected delay in operation of the exhaust gas recirculation valve is larger.

According to this preferred embodiment, when the exhaust gas recirculation valve is opened, the ignition timing of the engine is retarded as the detected delay in operation of the valve is larger. If the operation delay is large when the valve is opened, there is a tendency for the amount of fresh intake air to increase, and for the amount of fuel to be increased with the increase in the amount of fresh intake air. As a result, combustion temperature tends to rise, which causes generation of an increased amount of NOx. In such a case, by retarding the ignition timing as described above, it is possible to improve exhaust emission characteristics.

To attain the above object, according to a second aspect of the invention, there is provided a control system for an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve.

The control system according to the second aspect of the invention is characterized by comprising:
  a fuel supply cut-off module for cutting off supply of fuel to the engine during deceleration of the engine;
  a pressure-detecting module for detecting pressure within the intake passage; and
  an operation amount-limiting module for setting an upper limit of the operation amount of the exhaust gas recirculation valve according to a change in the pressure within the intake passage detected when the exhaust gas recirculation valve is opened and closed during the cut-off of fuel supply.

According to the second aspect of the invention, the same advantageous effects as provided by the first aspect of the invention can be obtained.

Preferably, the control system further comprises a flow rate degradation-estimating module for estimating a degree of flow rate degradation of the exhaust gas recirculation system based on the change in the pressure within the intake passage detected when the exhaust gas recirculation valve is opened and closed during the cut-off of fuel supply, and the operation amount-limiting module sets the upper limit of the operation amount of the exhaust gas recirculation valve according to the estimated degree of flow rate degradation of the exhaust gas recirculation system.

According to this preferred embodiment, the same advantageous effects as provided by the corresponding preferred embodiment of the first aspect of the invention can be obtained.

Preferably, the control system further comprises a operation delay-detecting module for detecting delay in operation of the exhaust gas recirculation valve, and a fuel amount-correcting module for correcting an amount of fuel to be supplied to the engine when the exhaust gas recirculation valve is opened such that the amount of fuel is increased as the detected delay in operation of the exhaust gas recirculation valve is larger.

According to this preferred embodiment, the same advantageous effects as provided by the corresponding preferred embodiment of the first aspect of the invention can be obtained.

Preferably, the control system further comprises an operation delay-detecting module for detecting delay in operation of the exhaust gas recirculation valve, and an ignition timing-correcting module for correcting ignition timing of the engine when the exhaust gas recirculation valve is opened such that the ignition timing is retarded as the detected delay in operation of the exhaust gas recirculation valve is larger.

According to this preferred embodiment, the same advantageous effects as provided by the corresponding preferred embodiment of the first aspect of the invention can be obtained.

To attain the above object, according to a third aspect of the invention, there is provided a method of controlling an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve.

The method according to the third aspect of the invention is characterized by comprising the steps of:
cutting off supply of fuel to the engine during deceleration of the engine;
detecting pressure within the intake passage when the exhaust gas recirculation valve is opened and closed during the cut-off of fuel supply; and
setting an upper limit of the operation amount of the exhaust gas recirculation valve according to a change in the pressure within the intake passage detected when the exhaust gas recirculation valve is opened and closed during the cut-off of fuel supply.

According to the third aspect of the invention, the same advantageous effects as provided by the first aspect of the invention can be obtained.

Preferably, the method further comprises the step of estimating a degree of flow rate degradation of the exhaust gas recirculation system based on the change in the pressure within the intake passage detected when the exhaust gas recirculation valve is opened and closed during the cut-off of fuel supply, and the step of setting an upper limit of the operation amount of the exhaust gas recirculation valve includes setting the upper limit according to the estimated degree of flow rate degradation of the exhaust gas recirculation system.

According to this preferred embodiment, the same advantageous effects as provided by the corresponding preferred embodiment of the first aspect of the invention can be obtained.

Preferably, the method further comprises the step of detecting delay in operation of the exhaust gas recirculation valve, and the step of correcting an amount of fuel to be supplied to the engine when the exhaust gas recirculation valve is opened such that the amount of fuel is increased as the detected delay in operation of the exhaust gas recirculation valve is larger.

According to this preferred embodiment, the same advantageous effects as provided by the corresponding preferred embodiment of the first aspect of the invention can be obtained.

Preferably, the method further comprises the step of detecting delay in operation of the exhaust gas recirculation valve, and the step of correcting ignition timing of the engine when the exhaust gas recirculation valve is opened such that the ignition timing is retarded as the detected delay in operation of the exhaust gas recirculation valve is larger.

To attain the above object, according to a fourth aspect of the invention, there is provided an engine control unit including a control program for causing a computer to carry out control of an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve.

The engine control unit according to the fourth aspect of the invention is characterized in that the control program causes the computer to cut off supply of fuel to the engine during deceleration of the engine, detect pressure within the intake passage when the exhaust gas recirculation valve is opened and closed during the cut-off of fuel supply, and set an upper limit of the operation amount of the exhaust gas recirculation valve according to a change in the pressure within the intake passage detected when the exhaust gas recirculation valve is opened and closed during the cut-off of fuel supply.

According to the fourth aspect of the invention, the same advantageous effects as provided by the first aspect of the invention can be obtained.

Preferably, the control program further causes the computer to estimate a degree of flow rate degradation of the exhaust gas recirculation system based on the change in the pressure within the intake passage detected when the exhaust gas recirculation valve is opened and closed during the cut-off of fuel supply, and when the control program causes the computer to set an upper limit of the operation amount of the exhaust gas recirculation valve, the control program causes the computer to set the upper limit according to the estimated degree of flow rate degradation of the exhaust gas recirculation system.

According to this preferred embodiment, the same advantageous effects as provided by the corresponding preferred embodiment of the first aspect of the invention can be obtained.

Preferably, the control program further causes the computer to detect delay in operation of the exhaust gas recirculation valve, and correct an amount of fuel to be supplied to the engine when the exhaust gas recirculation valve is opened such that the amount of fuel is increased as the detected delay in operation of the exhaust gas recirculation valve is larger.

According to this preferred embodiment, the same advantageous effects as provided by the corresponding preferred embodiment of the first aspect of the invention can be obtained.

Preferably, the control program further causes the computer to detect delay in operation of the exhaust gas recirculation valve, and correct ignition timing of the engine when the exhaust gas recirculation valve is opened such that the ignition timing is retarded as the detected delay in operation of the exhaust gas recirculation valve is larger.

According to this preferred embodiment, the same advantageous effects as provided by the corresponding preferred embodiment of the first aspect of the invention can be obtained.

The above and other objects, features, and advantages of the invention will become more apparent from the following detailed description taken in conjunction with the accompanying drawings.

BRIEF DESCRIPTION OF THE DRAWINGS

FIG. 4 shows an example of a #DPBEGFCN table;

DETAILED DESCRIPTION OF PREFERRED EMBODIMENT

Figure 1:
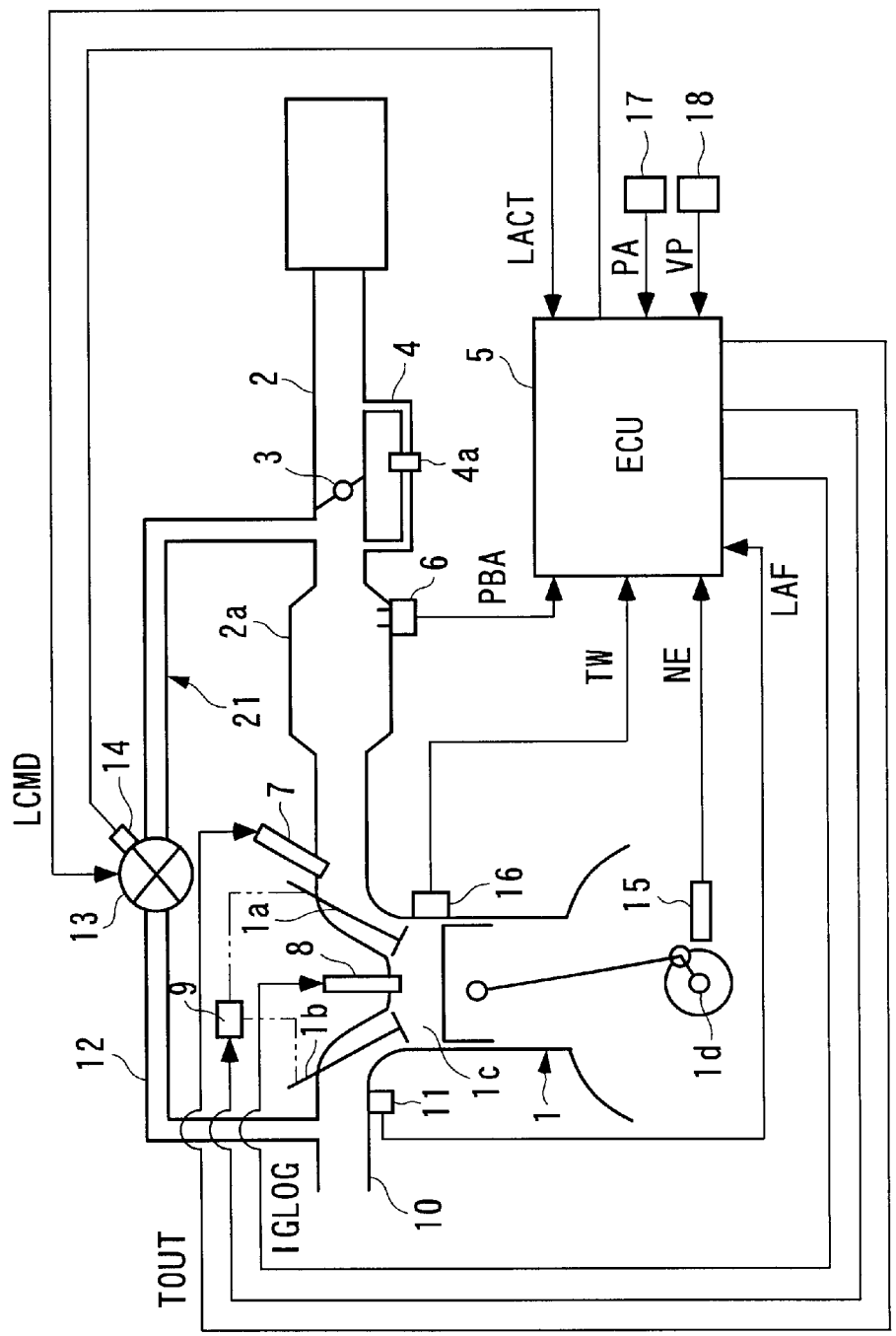
FIG. 1 is a block diagram schematically showing the arrangement of an internal combustion engine incorporating a control system according to an embodiment of the invention.

The invention will now be described in detail with reference to drawings showing a preferred embodiment thereof. Referring first to FIG. 1, there is schematically shown the arrangement of an internal combustion engine incorporating a control system according to the embodiment of the invention.

The internal combustion engine (hereinafter simply referred to as "the engine") 1 is a four-cylinder gasoline engine, for instance. The engine 1 includes an intake pipe 2 (intake passage) having an intake manifold 2a and a secondary intake air passage 4 with a control valve 4a arranged thereacross. A throttle valve 3 is arranged in the intake pipe 2 at a location upstream of the intake manifold 2a, and the secondary intake air passage 4 is formed in a manner bypassing the throttle valve 3. An intake pipe absolute pressure sensor 6 (pressure-detecting means) is provided in communication with the interior of the intake pipe 2 at a location downstream of the throttle valve 3, for detecting pressure within the intake pipe 2 as an intake pipe absolute pressure PBA and supplying an electric signal indicative of the sensed absolute pressure PBA to an ECU 5, referred to hereinafter.

Fuel injection valves 7, only one of which is shown, are each inserted into the intake pipe 2 at a location downstream of the throttle valve 3 and slightly upstream of an intake valve 1a, for injecting fuel toward a combustion chamber 1c of a corresponding one of the cylinders of the engine 1. A fuel injection time period TOUT of each fuel injection valve 7, i.e. the amount of fuel to be supplied to the engine 1 is controlled by a drive signal from the ECU 5. Further, the engine 1 has ignition plugs 8, only one of which is shown, each arranged in a manner inserted into the combustion chamber 1c of a corresponding one of the cylinders. An ignition timing IGLOG of each ignition plug 8 is also controlled by a drive signal from the ECU 5.

Further, the engine 1 has intake cams, not shown, for opening and closing the respective intake valves 1a, and exhaust cams, not shown, for opening and closing respective exhaust valves 1b. The intake cams and the exhaust cams are each comprised of a low-speed cam, and a high-speed cam having a higher cam nose than that of the low-speed cam. Each of the intake and exhaust cams can be switched by a cam profile changeover mechanism (hereinafter referred to as "the VTEC") 9 between the low-speed cam and the high-speed cam, whereby the valve timing of the intake valve 1a (or the exhaust valve 1b) is changed between a low-speed valve timing (hereinafter referred to as "Lo V/T"), and a high-speed valve timing (hereinafter referred to as "Hi V/T") in which the amount of valve lift is made larger and charging efficiency is made higher than the LoV/T. The operation of the VTEC 9 is also controlled by a drive signal from the ECU 5.

An air-fuel ratio sensor 11 is inserted into an exhaust pipe 10 (exhaust passage) of the engine 1, for detecting an oxygen concentration (air-fuel ratio) in exhaust gases and delivering to the ECU 5 an electric signal LAF dependent on the detected oxygen concentration. It should be noted that the exhaust pipe 10 is provided with a three-way catalyst, not shown, at a location downstream of the air-fuel ratio sensor 11, for purifying NOx, HC and CO in exhaust gases.

An exhaust gas recirculation passage (hereinafter referred to as "the EGR pipe") 12 extends to connect between the exhaust pipe 10 and a portion of the intake pipe 2 downstream of the throttle valve 3, for recirculating part of exhaust gases into the intake pipe 2, and in an intermediate portion of the EGR pipe 12, there is mounted an exhaust gas recirculation valve (hereinafter referred to as "the EGR valve") 13 for controlling the rate of exhaust gas recirculation. The EGR pipe 12 and the EGR valve 13 form an exhaust gas recirculation system 21. The EGR valve 13 is formed by an electromagnetic valve having a solenoid and has a valve lift amount (operation amount) of a valve element thereof, not shown, controlled by a drive signal from the ECU 5. Further, the EGR valve 13 is provided with a valve lift sensor 14 (operation delay-detecting means) for detecting an actual valve lift amount LACT. The valve lift sensor 14 delivers to the ECU 5 a signal indicative of the sensed actual valve lift amount LACT.

An engine rotational speed (NE) sensor 15 and a cylinder-discriminating sensor, not shown, are arranged in a manner facing toward a crankshaft 1d of the engine 1. The engine rotational speed sensor 15 generates a TDC signal pulse at a predetermined crank angle position of each cylinder a predetermined angle before a top dead center position at the start of an intake stroke of a piston, not shown, in the cylinder and delivers the same to the ECU 5, which calculates a rotational speed NE of the engine 1 (engine rotational speed) from the TDC signal pulses. On the other hand, the cylinder-discriminating sensor generates a cylinder-discriminating signal pulse for discriminating each cylinder from other ones, at a predetermined crank angle position of a particular cylinder, and also delivers the same to the ECU 5.

An engine coolant temperature sensor 16 is mounted in a cylinder block of the engine 1. The engine coolant temperature sensor 16 senses an engine coolant temperature TW which is a temperature of an engine coolant circulating within the cylinder block of the engine 1, and supplies an electric signal indicative of the sensed engine coolant temperature TW to the ECU 5. Further, the ECU 5 receives an electric signal indicative of a sensed atmospheric pressure PA from an atmospheric pressure sensor 17, and an electric signal indicative of a sensed vehicle speed VP of a vehicle on which the engine 1 is installed, from a vehicle speed sensor 18.

In the present embodiment, the ECU 5 implements fuel supply cut-off means, operation amount-limiting means, flow rate degradation-estimating means, operation delay-detecting means, fuel amount-correcting means, and ignition timing-correcting means. The ECU 5 is formed by a microcomputer including an I/O interface, a CPU, a RAM, and a ROM, none of which are shown. The signals from the above sensors including the intake pipe absolute pressure sensor 6 are each input to the CPU after A/D conversion and waveform shaping by the I/O interface.

The CPU carries out various kinds of arithmetic operations and control processes according to control programs read from the ROM. More specifically, the CPU determines an operating condition of the engine 1 based on the signals from the various sensors, and cuts off fuel supply to the engine 1 based on the determined operating condition of the engine 1, e.g. when the engine 1 is in a predetermined deceleration condition (the operation of the engine 1 in this condition will be hereinafter referred to as "the deceleration F/C operation"). Further, the CPU monitors the flow rate of the exhaust gas recirculation system for degradation due to (partial) clogging of the EGR pipe 12 and the EGR valve 13, and determines a lift amount command value LCMD for controlling the EGR valve 13, based on the monitored flow rate and an operating condition of the engine 1.

Further, the CPU calculates the fuel injection time period TOUT of each fuel injection valve 7 based on an operating condition of the engine 1, an operative state of the EGR valve 13, etc. by using the following equation (1):

$$TOUT = TIM \times KCMDT \times KEGR \times KTOTAL \quad (1)$$

wherein TIM represents a basic fuel injection time period which is calculated by a retrieval from a TI map, not shown, set according to the engine rotational speed NE and the intake pipe absolute pressure PBA, and KCMDT represents an air-fuel ratio correction coefficient which is set based on the result of detection by the air-fuel ratio sensor 11 when the engine 1 is in an operating region for air-fuel ratio feedback control.

KEGR represents an EGR-dependent correction coefficient which is set to a smaller value than 1.0 during execution of exhaust gas recirculation (i.e. when the EGR valve 13 is open) so as to reduce the fuel injection amount in accordance with reduction of the amount of fresh intake air caused by the exhaust gas recirculation. The setting of the KEGR value will be described in detail hereinafter. Further, KTOTAL is obtained by multiplying all other correction coefficients except the above correction coefficients TIM, KCMDT and KEGR, including a coolant temperature-dependent correction coefficient TTW, which is set according to the engine coolant temperature TW.

Further, the CPU calculates the ignition timing IGLOG (advance angle amount with respect to the top dead center position) by using the following equation (2)

$$IGLOG = IGMAP + IGCR \quad (2)$$

wherein IGMAP represents a basic ignition timing obtained by correcting a basic map value calculated by retrieval from an IG map, not shown, which is set according to the engine rotational speed NE and the intake pipe absolute pressure PBA, by the above EGR-dependent correction coefficient KEGR and other correction coefficients. The setting of the IGMAP value will be described in detail hereinafter. Further, IGCR represents a correction term set according to an operating condition of the engine 1.

Hereafter, the control processes which are executed by the ECU 5 will be described with reference to FIGS. 2 to 17. These control processes are each carried out in synchronism with generation of each pulse of the TDC signal. In the following description, fixed data items stored in the ROM each have a symbol "#" attached to a head thereof for discrimination from non-fixed data.

Figure 2:
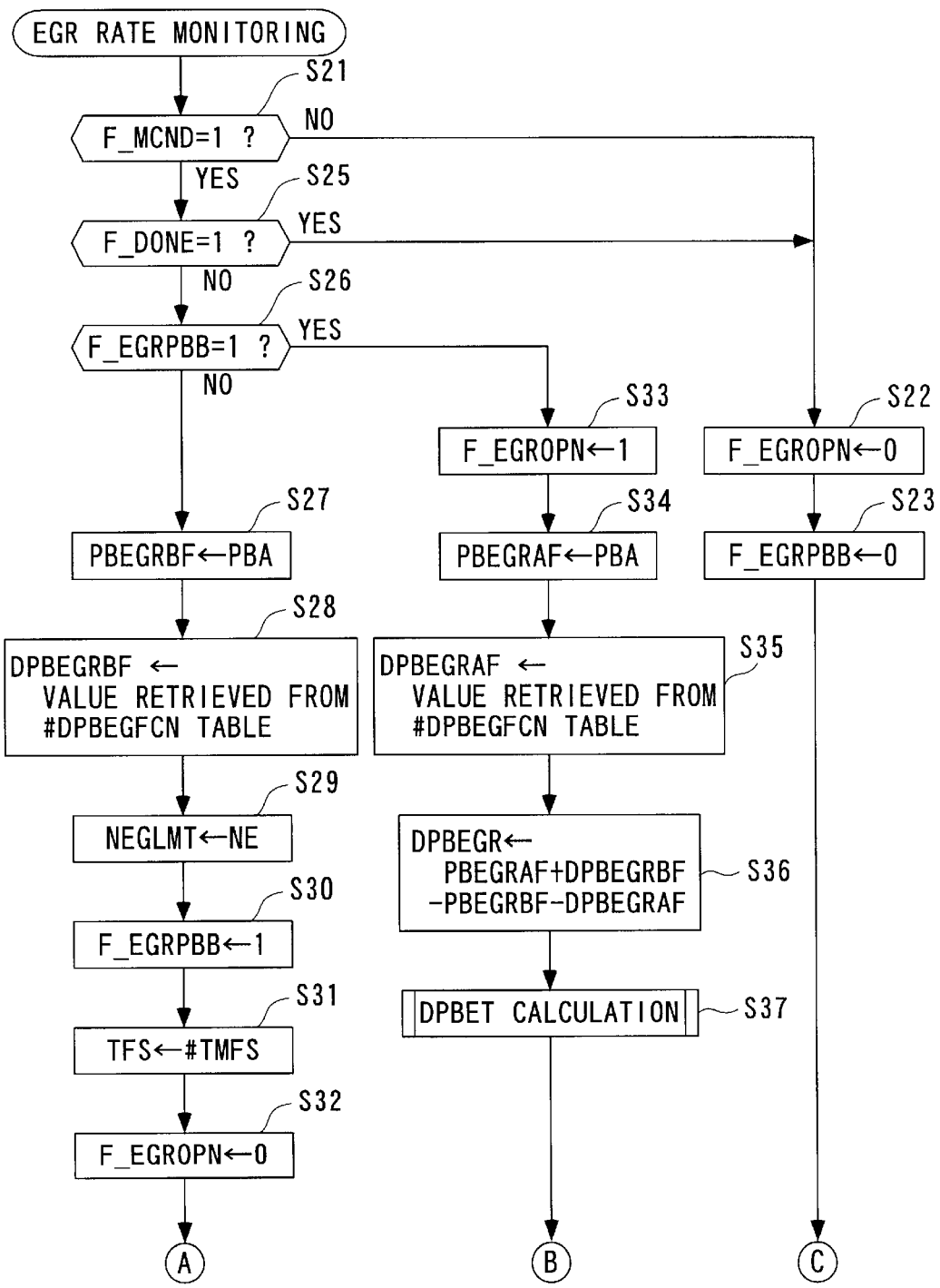
FIG. 2 is a flowchart showing a routine for carrying out an EGR rate-monitoring process.
Figure 3:
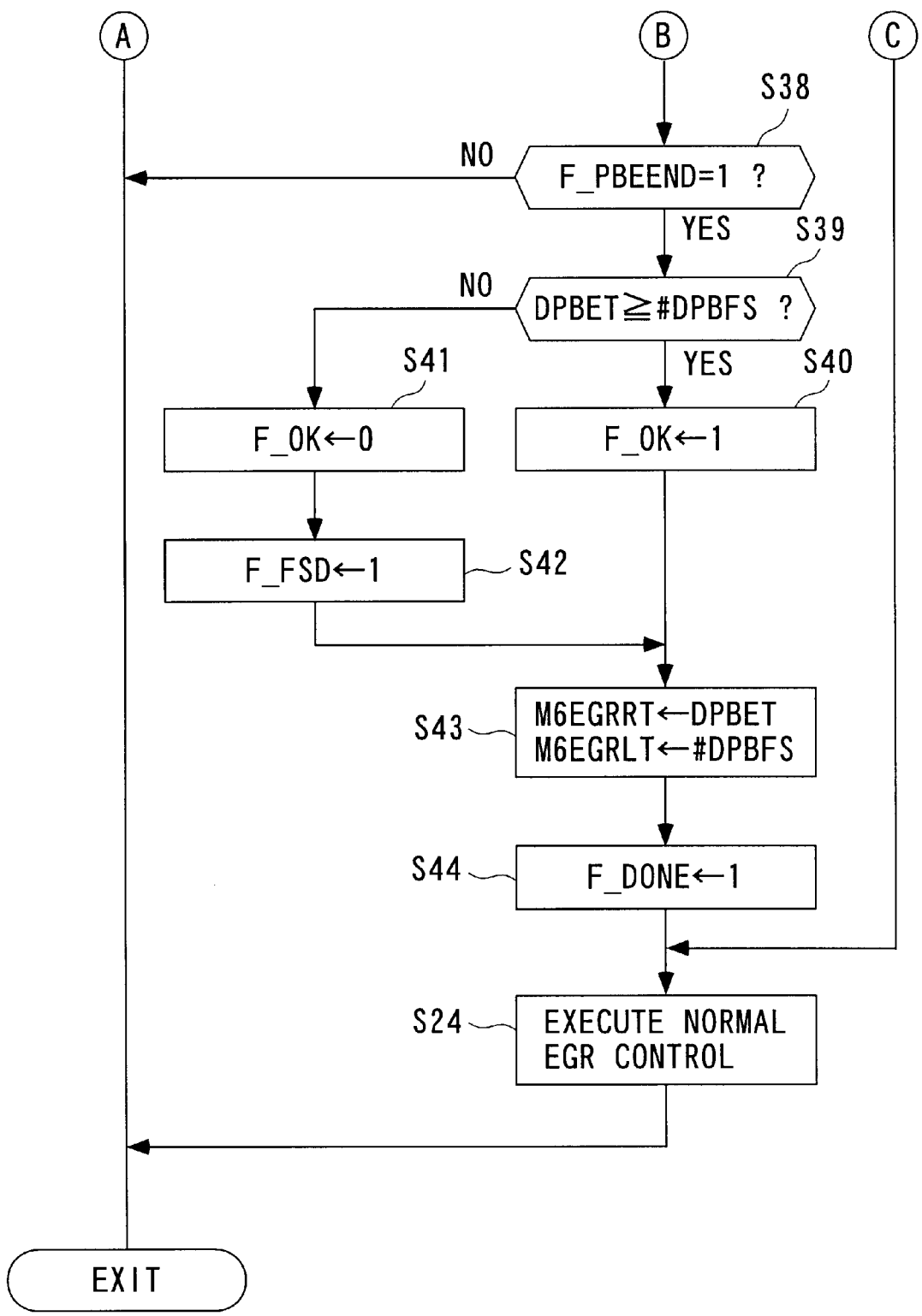
FIG. 3 is a continuation of the FIG. 2 flowchart.

FIGS. 2 and 3 show a routine for carrying out the EGR rate-monitoring process. This process is executed so as to determine flow rate degradation which is caused e.g. by (partial) clogging of the exhaust gas recirculation system 21, by monitoring the exhaust gas recirculation rate (hereinafter referred to as "the EGR rate") of the EGR pipe 12 based on a change in the intake pipe absolute pressure PBA between before and after opening the EGR valve 13 during the deceleration F/C operation.

In the present process, first, it is determined in a step S21 whether or not a monitoring-permitting flag F_MCND assumes "1". The monitoring-permitting flag F_MCND is set to "1" by a subroutine, not shown, to indicate satisfaction of conditions for executing the EGR rate monitoring, when the engine 1 is in the deceleration F/C operation, and at the same time the engine rotational speed NE, the intake pipe absolute pressure PBA, the engine coolant temperature TW and the vehicle speed VP are within respective predetermined ranges. If the answer to the question is negative (NO), i.e. if the conditions for executing the EGR rate monitoring are not satisfied, a valve opening command flag F_EGROPN and an intake pressure detection end flag F_EGRPBB are set to "0" in respective steps S22, S23, and then normal exhaust gas recirculation control is executed in a step S24, followed by terminating the program.

If the answer to the question of the step S21 is affirmative (YES), i.e. if the conditions for execution of the EGR rate monitoring are satisfied, it is determined in a step S25 whether or not a determination end flag F_DONE assumes "1". If the answer to this question is affirmative (YES), i.e. if F_DONE=1 holds, which means determination as to whether or not the EGR rate is normal has already been completed, the steps S22 to S24 are executed, followed by terminating the program.

On the other hand, if the answer to the question of the step S25 is negative (NO), which means the determination as to the EGR rate has not been completed, it is determined in a step S26 whether or not the intake pressure detection end flag F_EGRPBB assumes "1". The flag F_EGRPBB is set to "1" when detection of the intake pipe absolute pressure PBA before opening the EGR valve 13 is completed, as described hereinafter. The flag F_EGRPBB initially assumes "0", and hence the program proceeds to a step S27, wherein the sensed intake pipe absolute pressure PBA is stored as a pre-valve-opening intake pressure PBEGRBF. Then, in a step S28, a correction value retrieved from a #DPBEGFCN table shown in FIG. 4 according to the engine rotational speed NE is set to a pre-valve-opening correction value DPBEGRBF. The #DPBEGFCN table is set such that the correction value #DPBEGFCN becomes larger as the engine rotational speed NE is lower.

Then, in a step S29, the engine rotational speed NE at this time point is stored as a pre-valve-opening rotational speed NEGLMT, and in a step S30, the intake pressure detection end flag F_EGRPBB is set to "1". Then, a downcount timer TFS is set to a predetermined time period #TMFS (e.g. 2 seconds) and started in a step S31, and the valve-opening command flag F_EGROPN is set to "0" in a step S32, followed by terminating the program.

After the intake pressure detection end flag F_EGRPBB is set to "1" in the step S30, the answer to the question of the step S26 becomes affirmative (YES), and hence the program proceeds therefrom to a step S33, wherein the valve-opening command flag F_EGROPN is set to "1" so as to open the EGR valve 13 for monitoring of the EGR rate. Then, the intake pipe absolute pressure PBA detected at this time point is stored as a post-valve-opening intake pressure PBEGRAF in a step S34. In the following step S35, similarly to the step S28, a correction value #DPBEGFCN is retrieved from the FIG. 4 #DPBEGFCN table according to the engine rotational speed NE and set to a post-valve-opening correction value DPBEGRAF.

Then, the program proceeds to a step S36, wherein a corrected change amount DPBEGR is calculated based on the pre-valve-opening and post-valve-opening intake pressures PBEGRBF, PBEGRAF and the pre-valve-opening and post-valve-opening correction values DPBEGRBF, DPBEGRAF, by using the following equation (3):

$$DPBEGR = PBEGRAF + DPBEGRBF - PBEGRBF - DPBEGRAF \quad (3)$$

As is apparent from the above equation, the corrected change amount DPBEGR is obtained by correcting the amount of change (PBEGRAF−PBEGRBF) in the intake pipe absolute pressure PBA between before and after the valve opening, by the pre-valve-opening and post-valve-opening correction values DPBEGRBF, DPBEGRAF obtained according to the engine rotational speed NE, so that an influence of the engine rotational speed NE upon the intake pipe absolute pressure PBA when the exhaust gas recirculation valve is opened is eliminated.

Figure 5:
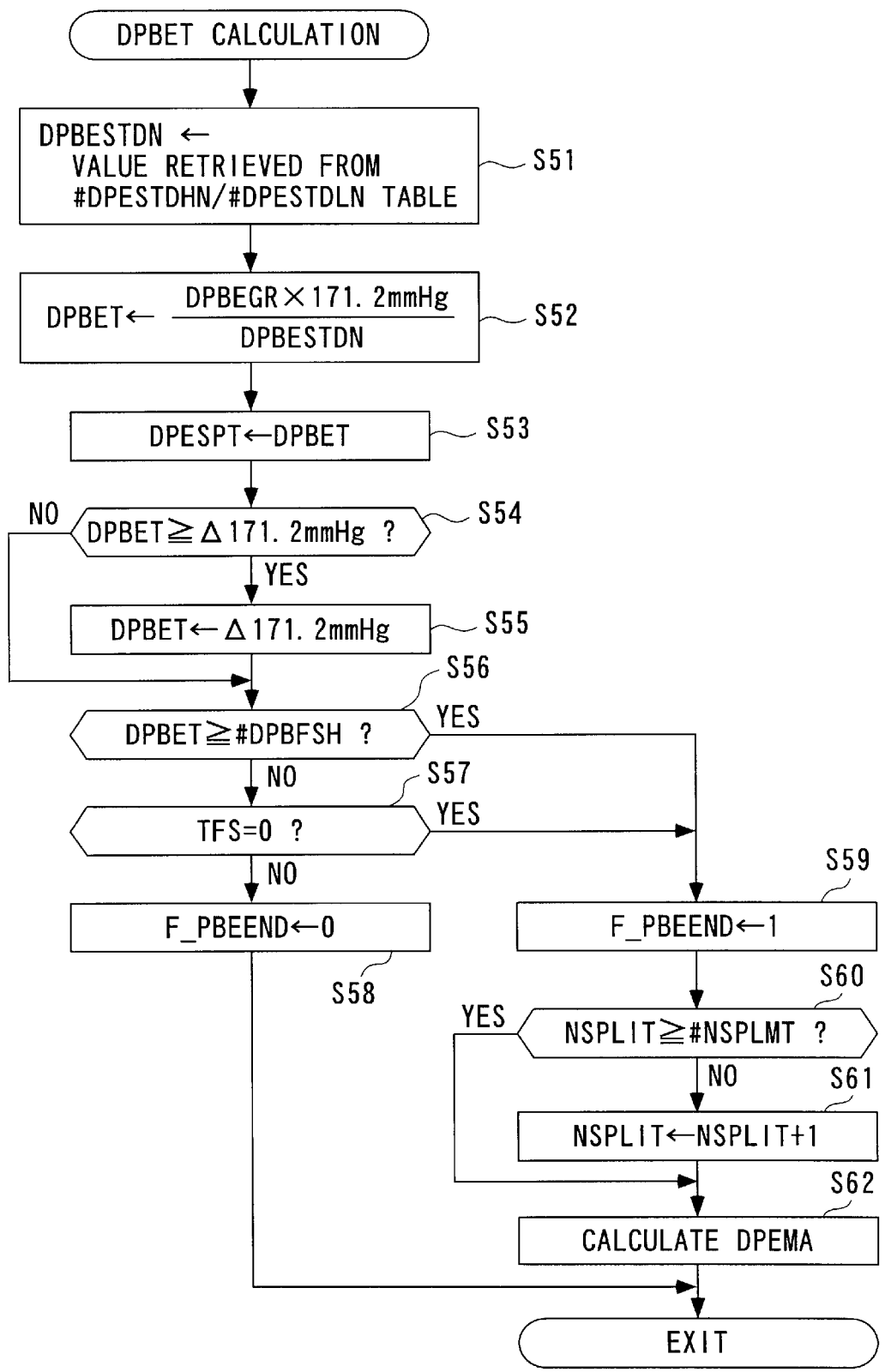
FIG. 5 is a flowchart showing a subroutine for calculating a normalized change amount DPBET.
Figure 6:
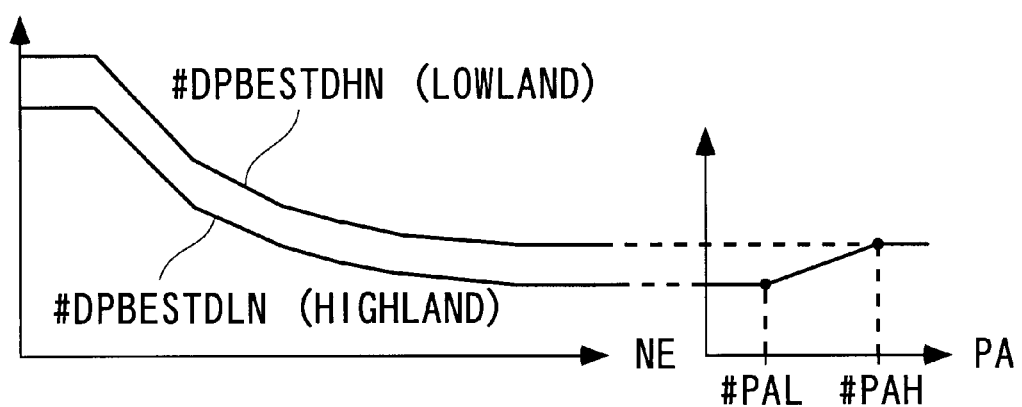
FIG. 6 shows examples of #DPESTDHN/#DPESTDLN tables.

Then, in a step S37, a normalized change amount DPBET is calculated by using the corrected change amount DPBEGR calculated as above. FIG. 5 shows a subroutine for calculating the normalized change amount DPBET. In the calculation process, first in a step S51, a value retrieved from #DPESTDHN/#DPESTDLN tables shown in FIG. 6 according to the engine rotational speed NE is stored as a reference change amount DPBESTDN. The #DPESTDHN/#DPESTDLN tables are formed by tabulating data values obtained by measuring the amount of change in the intake pipe absolute pressure PBA between before and after opening the valve in association with each of different values of the engine rotational speed NE when the EGR valve 13 is fully opened in a normal operative state without flow rate degradation of the exhaust gas recirculation system 21 due to clogging or the like. The tables are set such that the change amount becomes larger as the engine rotational speed NE is lower. Further, the #DPESTDHN/#DPESTDLN tables store data values for lowlands, which are each obtained under an atmospheric pressure #PAH (e.g. 760 mmHg) on a lowland, and data values for highlands, which are each obtained under an atmospheric pressure #PAL (e.g. 460 mmHg) on a highland. When the atmospheric pressure PA is between the #PAH value and the #PAL value, the reference change amount DPBESTDN is calculated by interpolation.

Then, the program proceeds to a step S52, wherein the normalized change amount DPBET is calculated based on the reference change amount DPBESTDN and the corrected change amount DPBEGR obtained in the step S36 in FIG. 2, by using the following equation (4):

$$DPBET = (DPBEGR/DPBESTDN) \times 171.2 \text{ mmHg} \quad (4)$$

wherein DPBEGR/DPBESTDN represents the ratio of the corrected change amount DPBEGR indicative of a change amount actually obtained to the reference change amount DPBESTDN indicative of a change amount to be obtained in the normal state of the exhaust gas recirculation system 21, i.e. a degree of flow rate degradation of the exhaust gas recirculation system 21 measured with respect to a normal flow rate of the same. Further, the value of 171.2 mmHg is a reference value representative of the normal state of that the exhaust gas recirculation system 21.

In the following step S53, the normalized change amount DPBET calculated in the step 52 is stored as a stored value DPESPT for use in calculating a moving average value DPEMA, referred to hereinafter, and then the program proceeds to a step S54, wherein it is determined whether or not the normalized change amount DPBET is equal to or larger than the reference value Å171.2 mmHg. If the answer to the question is affirmative (YES), i.e. if DPBET≧Å171.2 mmHg holds, the normalized change amount DPBET is limited to the reference value Å171.2 mmHg in a step S55, followed by the program proceeding to a step S56. On the other hand, if the answer to the question of the step S54 is negative (NO), the program immediately proceeds to the step S56.

In the step S56, it is determined whether or not the normalized change amount DPBET is equal to or larger than a predetermined value #DPBFSH. The predetermined value #DPBFSH is set to a value corresponding to a clogging ratio (percentage) (e.g. equal to or lower than 10%) which does not permit progress of flow rate degradation of the exhaust gas recirculation system 21 due to deposition of carbon, without effecting lift amount limitation of the EGR valve 13. If the answer to the question is negative (NO), i.e. if DPBET<#DPBFSH holds, it is determined in a step S57 whether or not the count of the downcount timer TFS which has been started in the step S31 in FIG. 2 is equal to "0". If the answer to the question is negative (NO), i.e. if the predetermined time period #TMFS has not elapsed after the EGR valve 13 was opened, it is judged that calculation of the normalized change amount DPBET has not been completed, and a change amount calculation end flag F_PBEEND is set to "0" in a step S58, followed by terminating the program.

On the other hand, if the answer to the question of the step S57 is affirmative (YES), i.e. if the predetermined time period #TMFS has elapsed after the EGR valve 13 was opened, or if the answer to the question of the step S56 is affirmative (YES), i.e. if DPBET≧#DPBFSH holds, it is judged that calculation of the normalized change amount DPBET has been completed, and the change amount calculation end flag F_PBEEND is set to "1" in a step S59 so as to indicate the fact. Then, it is determined in a step S60 whether or not the count of a counter NSPLIT is equal to or larger than a predetermined number of times #NSPLMT (e.g. 6 times). If the count of the counter NSPLIT has not reached the predetermined number of times #NSPLMT, the count of the counter NSPLIT is incremented in a step S61, followed by the program proceeding to a step S62, whereas if the count (NSPLIT) of the counter NSPLIT has reached the predetermined number of times #NSPLMT, the program immediately proceeds to the step S62.

In the step S62, the moving average value DPEMA of the normalized change amount DPBET is calculated based on the stored values DPESPT of the normalized change amount DPBET stored in the step S53, by using the following equation (5):

$$DPEMA = (DPESPT(n) + DPESPT(n-1) + \ldots + \quad (5)$$

-continued $$DPESPT(n - NSPLIT + 1))/NSPLIT$$

As is apparent from the above equation, the moving average value DPEMA is an average value of NSPLIT values of the normalized change amount DPBET calculated in respective loops from a loop (NSPLIT−1) loops before the present loop to the present loop.

As described above, according to the FIG. 5 process, the normalized change amount DPBET is calculated as a ratio (DPBEGR/DPBESTDN) of the corrected change amount DPBEGR obtained by correcting the amount of change in the intake pipe absolute pressure PBA between before and after opening the EGR valve 13 during the deceleration F/C operation of the engine 1 to the reference change amount DPBESTDN to be obtained when the exhaust gas recirculation system 21 is in the normal state, and hence indicates a degree of degradation of a flow rate of the exhaust gas recirculation system 21 with respect to a normal flow rate thereof. Further, the moving average value DPEMA is an average value of NSPLIT values of the normalized change amount DPBET calculated so far, and hence variations in the intake pipe absolute pressure PBA and the EGR rate are compensated for by the averaging, which ensures high reliability. Therefore, the moving average value DPEMA can be used as a parameter for accurately evaluating the degree of flow rate degradation of the exhaust gas recirculation system 21. An upper limit lift amount LLIFT of the EGR valve 13 is calculated based on the moving average value DPEMA, as described in detail hereinafter.

Referring again to FIGS. 2 and 3, in a step S38 following the step S37, it is determined whether or not the change amount calculation end flag F_PBEEND assumes "1". If the answer to the question is negative (NO), the program is immediately terminated. On the other hand, if the answer to the question of the step S38 is affirmative (YES), which means that calculation of the normalized change amount DPBET has been completed, it is determined in a step S39 whether or not the normalized change amount DPBET calculated in the step S37 is equal to or larger than a reference value #DPBFS (e.g. 20 mmHg). If the answer to the question is affirmative (YES), i.e. if DPBET≧#DPBFS holds, it is judged that the degree of flow rate degradation of the exhaust gas recirculation system 21 is low and hence the EGR rate is normal, and a flow normality flag F_OK is set to "1" in a step S40 so as to indicate the fact.

On the other hand, if the answer to the question of the step S39 is negative (NO), i.e. if DPBET<#DPBFS holds, it is judged that the degree of the flow rate degradation of the exhaust gas recirculation system 21 is high and hence the EGR rate is not normal, and the flow rate normality flag F_OK is set to "0" in a step S41 so as to indicate the fact. Then, the program proceeds to a step S42, wherein a flow rate abnormality flag F_FSD is set to "1".

In the following step S43, the normalized change amount DPBET and the reference value #DPBFS are stored in a backup RAM as storage values M6EGRRT, M6EGRLT, respectively. Then, the determination end flag F_DONE is set to "1" in a step S44 to indicate the completion of the determination as to the EGR flow rate degradation, and the program proceeds to the step S24, wherein the normal exhaust gas recirculation control is executed. That is, even when it is determined that the EGR rate is not normal, the exhaust gas recirculation control is continued without being interrupted. It should be noted that although in the step S39, the normalized change amount DPBET before being subjected to the moving-averaging process is compared with the reference value #DPBFS, if it is required to make more accurate determination as to whether the EGR rate is normal or abnormal, the moving average value DPEMA is used in place of the normalized change amount DPBET.

Figure 7:
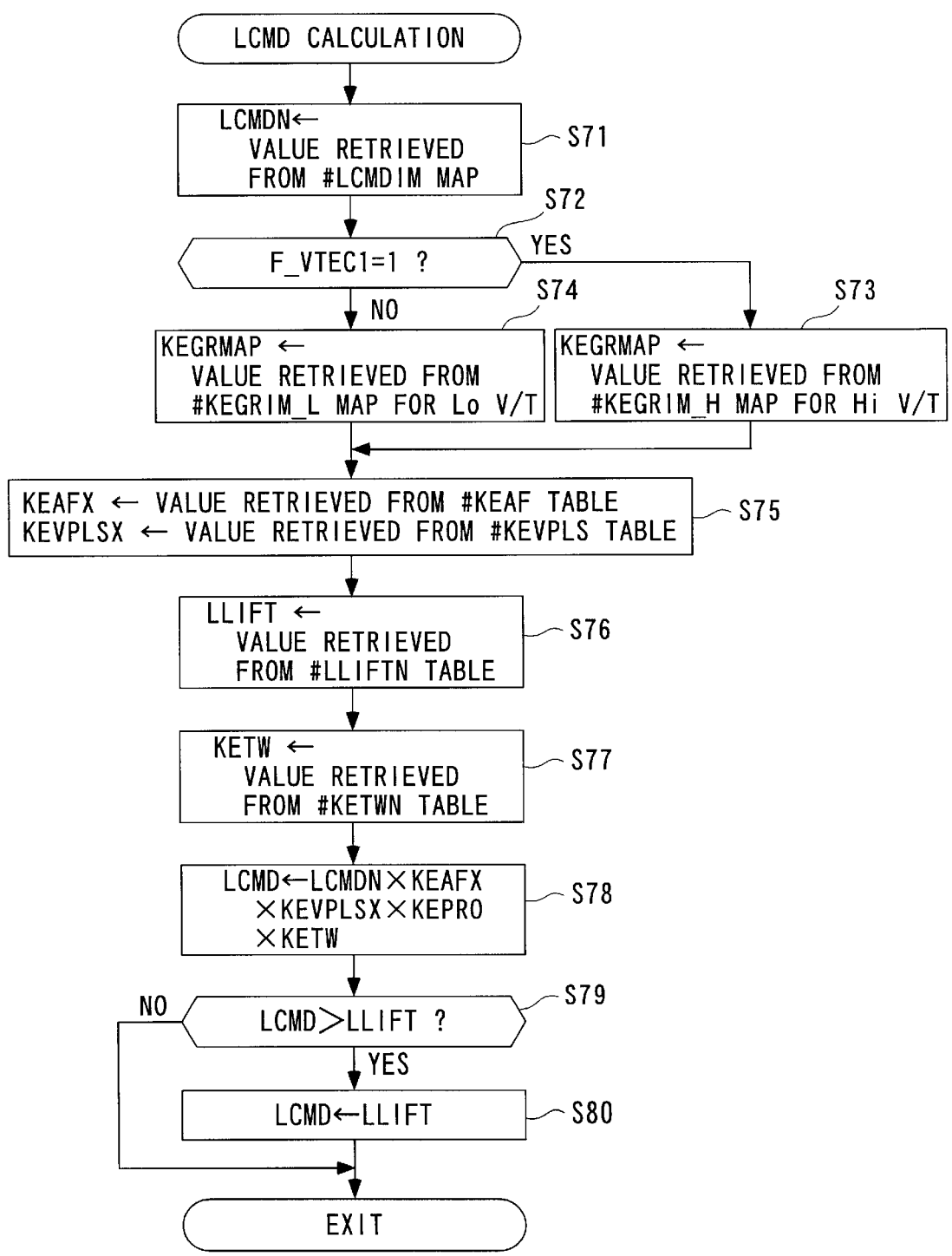
FIG. 7 is a flowchart showing a subroutine for calculating a lift amount command value LCMD for controlling an EGR valve.

FIG. 7 shows a subroutine for calculating the lift amount command value LCMD for controlling the EGR valve 13. In the present process, retrieval of a map value KEGRMAP of the EGR-dependent correction coefficient KEGR for correcting the fuel injection time period TOUT is also carried out. In the process, first in a step S71, a value retrieved from a #LCMDIM map according to the engine rotational speed NE and the intake pipe absolute pressure PBA is set to a basic command value LCMDN of the lift amount command value LCMD. The #LCMDIM map, not shown, is set such that the basic command value LCMDN becomes larger as the NE value or the PBA value is higher.

Then, it is determined in a step S72 whether or not a VTEC flag F_VTEC1 assumes "1". If the answer to the question is affirmative (YES), i.e. if the valve timing has been set to Hi V/T by the VTEC 9, a value retrieved from a #KEGRIM_H map, not shown, for Hi V/T is set to a map value KEGRMAP of the EGR-dependent correction coefficient KEGR in a step S73. On the other hand, if the answer to the question of the step S72 is negative (NO), i.e. if the valve timing has been set to Lo V/T, the program proceeds to a step S74, wherein, similarly to the step S73, a value retrieved from a #KEGRIM_L map, not shown, which is set for Lo V/T, separately from the #KEGRIM_H map for Hi V/T, is set to the map value KEGRMAP of the EGR-dependent correction coefficient KEGR. It should be noted that these map values KEGRMAP are set assuming that the engine 1 is operating on a lowland and in a steady state.

Figure 8:
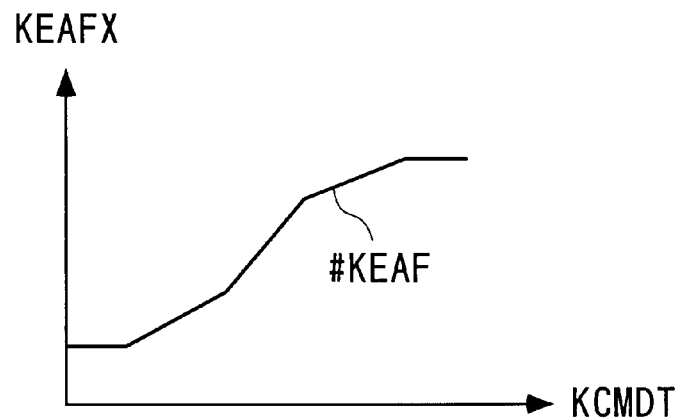
FIG. 8 shows an example of a #KEAF table.
Figure 9:
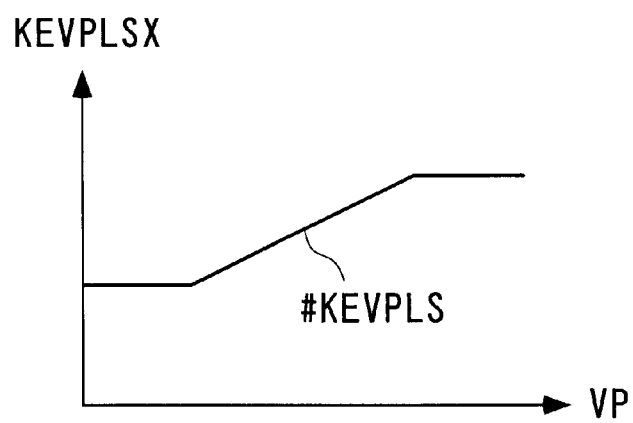
FIG. 9 shows an example of a #KEVPLS table.

Then, the program proceeds to a step S75, wherein a value retrieved from a #KEAF table shown in FIG. 8 according to the air-fuel ratio correction coefficient KCMDT for correcting the fuel injection time period TOUT is set to an air-fuel ratio-dependent correction coefficient KEAFX for correcting the lift amount command value LCMD, and at the same time, a value retrieved from a #KEVPLS table shown in FIG. 9 according to the vehicle speed VP is set to a vehicle speed-dependent correction coefficient KEVPLSX. The FIG. 8 #KEAF table is set such that as the KCMDT value is larger, the air-fuel ratio-dependent correction coefficient KEAFX becomes larger, while the FIG. 9 #KEVPLS table is set such that as the vehicle speed VP is higher, the vehicle speed-dependent correction coefficient KEVPLSX becomes larger.

Figure 10:
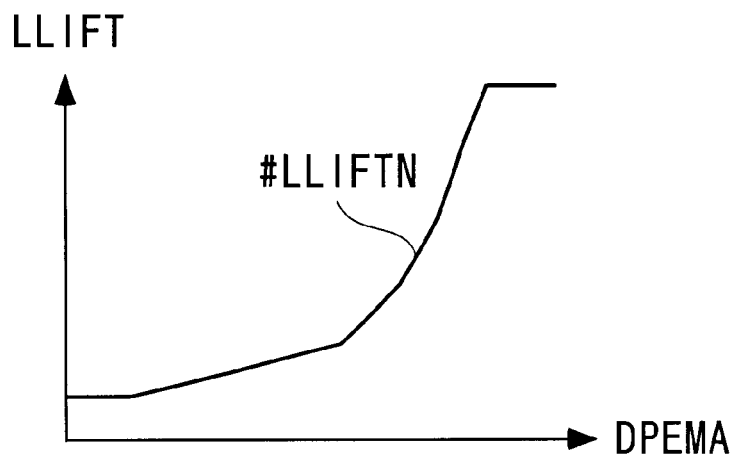
FIG. 10 shows an example of a #LLIFTN table for use in setting an upper limit lift amount.

Then, in a step S76, a value retrieved from a #LLIFTN table shown in FIG. 10 according to the moving average value DPEMA of the normalized change amount DPBET calculated in the step S62 in FIG. 5 is set to an upper limit lift amount LLIFT of the EGR valve 13. The #LLIFTN table is set such that as the moving average value DPEMA is smaller, i.e. as the degree of flow rate degradation of the exhaust gas recirculation system 21 is larger, the upper limit lift amount LLIFT becomes smaller. Further, the upper limit lift amount LLIFT is set such that the EGR rate controlled by the upper limit lift amount LLIFT is held within the recirculation capacity of the exhaust gas recirculation system 21 dependent on the degree of flow rate degradation thereof.

Figure 11:
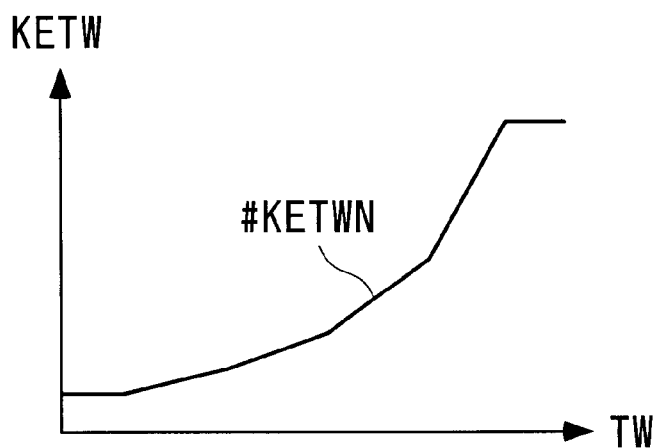
FIG. 11 shows an example of a #KETWN table.

Then, the program proceeds to a step S77, wherein a value retrieved from a #KETWN table shown in FIG. 11 according to the engine coolant temperature TW is set to a coolant temperature-dependent correction coefficient KETW. The #KETWN table is set such that as the engine coolant temperature TW is lower, the coolant temperature-dependent correction coefficient KETW becomes smaller.

Then, the program proceeds to a step S78, wherein the lift amount command value LCMD for controlling the EGR valve 13 is calculated by multiplying the basic command value LCMDN of the lift amount command value LCMD, which has been set in the step S71, by the air-fuel ratio-dependent correction coefficient KEAFX and the vehicle speed-dependent correction coefficient KEVPLSX, which have been set in the step S75, the coolant temperature-dependent correction coefficient KETW, which has been set in the step S77, and a mass production-related correction coefficient KEPRO, by using the following equation (6):

$$LCMD = LCMDN \times KEAFX \times KEVPLSX \times KEPRO \times KETW \quad (6)$$

In the following step S79, it is determined whether or not the lift amount command value LCMD calculated in the step S78 is larger than the upper limit lift amount LLIFT set in the step S76. If the answer to the question is negative (NO), the program is immediately terminated. On the other hand, if the answer to the question of the step S79 is affirmative (YES), i.e. if LCMD>LLIFT holds, the lift amount command value LCMD is limited to the upper limit lift amount LLIFT in a step S80, followed by terminating the program.

As described above, according to the FIG. 7 process, the lift amount command value LCMD is limited to the upper limit lift amount LLIFT. The upper limit lift amount LLIFT is set as above, and hence the limitation of the lift amount command value LCMD to the upper limit lift amount LLIFT makes it possible to prevent a flow load exceeding the recirculation capacity of the exhaust gas recirculation system 21 from being applied to the system 21. As a result, deposition of carbon and the resultant progress of flow rate degradation of the exhaust gas recirculation system 21 can be suppressed. Further, since the moving average value DPEMA for use as a parameter in the setting of the upper limit lift amount LLIFT is an average value of a plurality of values of the normalized change amount DPBET, it is possible to appropriately set the upper limit lift amount LLIFT according to the degree of flow rate degradation while compensating for variations in the intake pipe absolute pressure PBA. Therefore, the EGR rate can be appropriately limited, and exhaust gas recirculation control can be executed to the maximum possible extent. Further, since exhaust gases can be supplied to the intake pipe 2 at the limited EGR rate without loss, by setting the fuel injection time period TOUT and the ignition timing IGLOG according to the lift amount command value LCMD thus set, it is possible to properly control the fuel injection time period TOUT and the ignition timing IGLOG.

Figure 12:
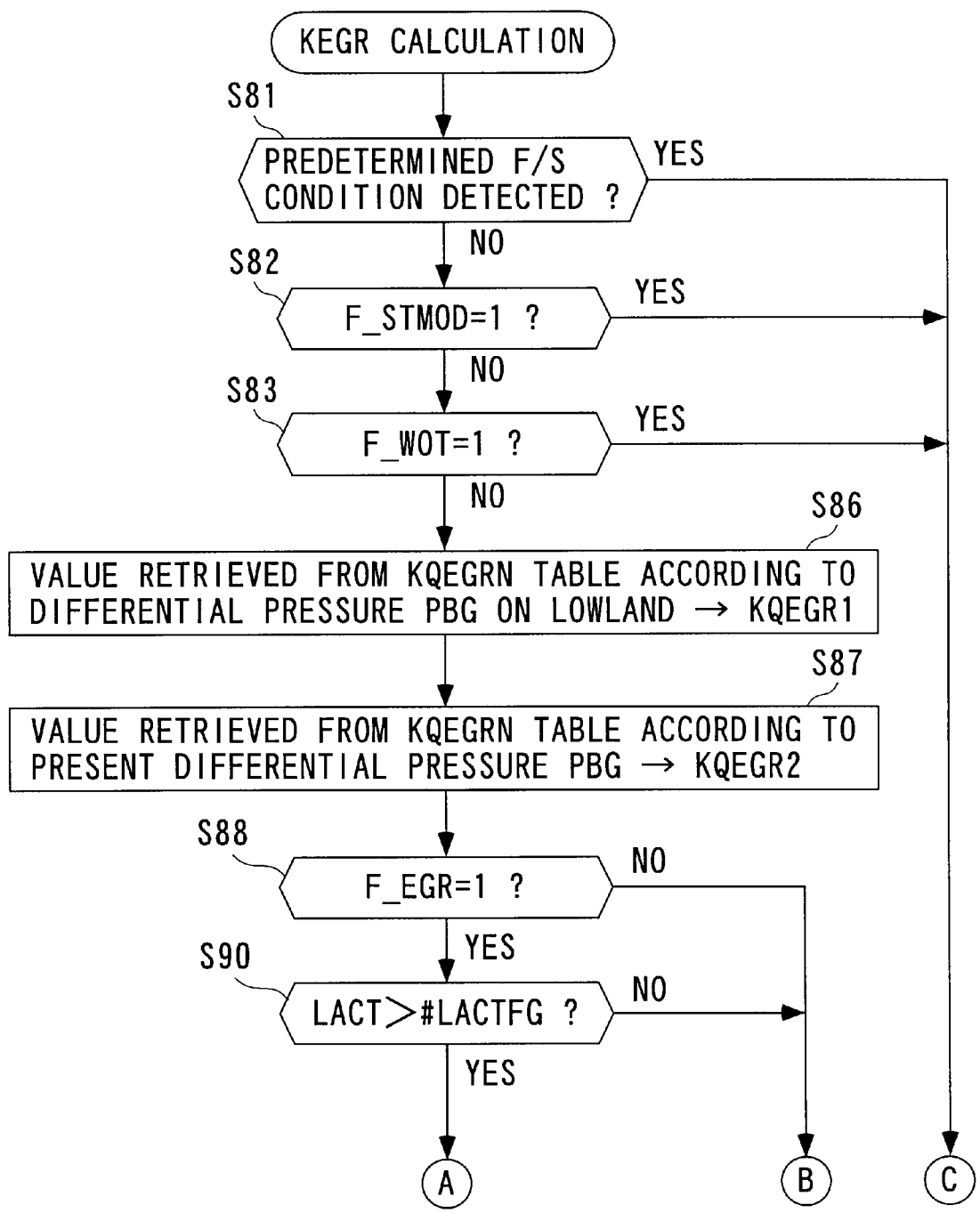
FIG. 12 is a flowchart showing a subroutine for calculating an EGR-dependent correction coefficient KEGR.
Figure 13:
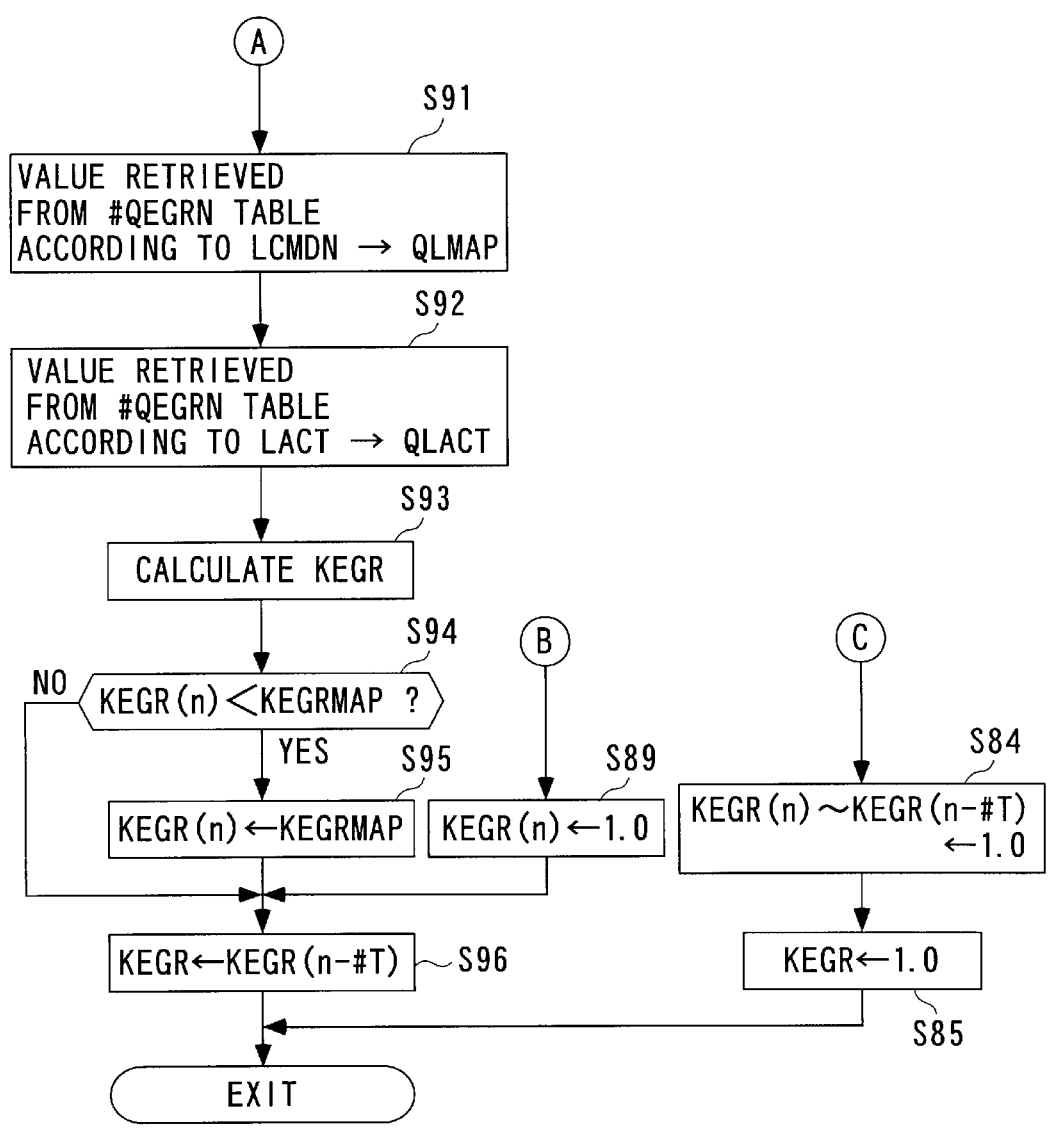
FIG. 13 is a continuation of the FIG. 12 flowchart.

FIGS. 12 and 13 show a subroutine for calculating the EGR-dependent correction coefficient KEGR for correcting the fuel injection time period TOUT, which is used in the aforementioned equation (1). In the present process, first, it is determined in a step S81 whether or not a predetermined fail-safe (F/S) condition has been detected, then in a step S82 whether or not a start mode flag F_STMOD assumes "1", and further in a step S83 whether or not a wide-open throttle (WOT) flag F_WOT assumes "1". If any one of the answers to the questions of the respective steps S81 to S83 is affirmative (YES), i.e. if the predetermined fail-safe condition has been detected, or if the engine 1 is in the start mode or in a high-load operating condition in which the throttle valve 3 is fully open, it is judged that basic conditions for executing exhaust gas recirculation are not satisfied, and the values of EGR-dependent correction coefficient KEGR (n-#T) calculated in preceding (n-#T) loops and the present loop (n) are all set to 1.0 in a step S84, and the value of the EGR-dependent correction coefficient KEGR(n) for use in the present loop is set to 1.0 in a step S85, thereby inhibiting correction of the fuel injection time period TOUT by the EGR-dependent correction coefficient KEGR in the present loop.

Figure 14:
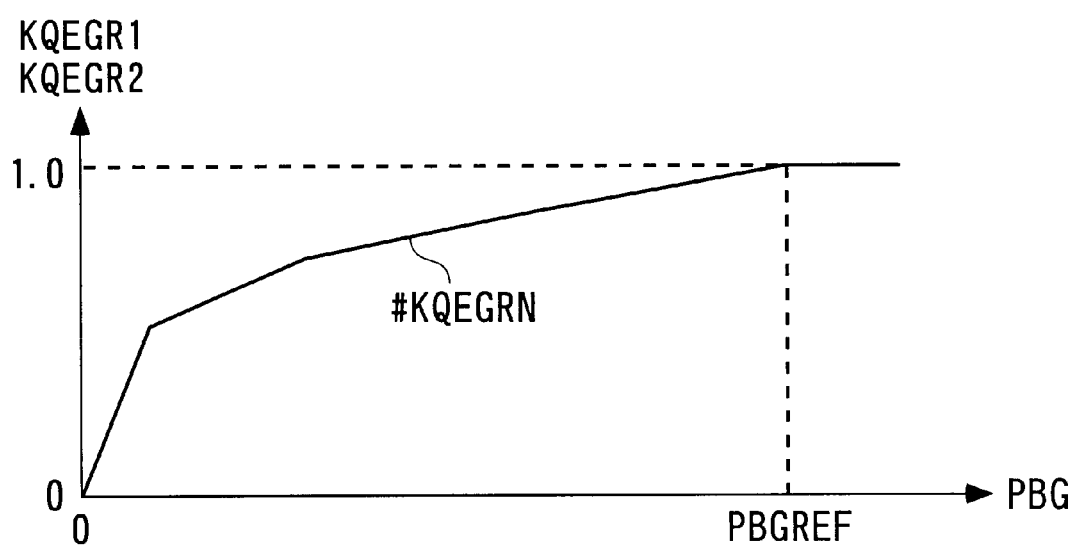
FIG. 14 shows an example of a #KQEGRN table.

On the other hand, if the answers to the questions of the respective steps S81 to S83 are all negative (NO), an EGR rate-dependent correction coefficient KQEGR is retrieved from a #KQEGRN table shown in FIG. 14 according to a differential pressure PBG between the atmospheric pressure PA and the intake pipe absolute pressure PBA on a lowland, and set to a lowland EGR rate-dependent coefficient KQEGR1 in a step S86. When the differential pressure PBG between the atmospheric pressure PA and the intake pipe absolute pressure PBA varies, the actual EGR rate varies accordingly. Therefore, a value of the EGR rate obtained when the differential pressure PBG is equal to a predetermined large reference differential pressure PBGREF (e.g. 550 mmHg) is set to 1.0, and the EGR rate-dependent coefficient KQEGR is calculated as a ratio of the EGR rate obtained for each value of the differential pressure PBG to the EGR rate obtained for PBG=PBGREF. The differential pressure PBG on a lowland is a differential pressure between the atmospheric pressure (760 mmHg) on the lowland and the intake pipe absolute pressure PBA at the present time point.

In the following step S87, similarly to the step S86, an EGR rate-dependent coefficient KQEGR is retrieved from the FIG. 14 #KQEGRN table according to the present differential pressure PBG and set to the present EGR rate-dependent coefficient KQEGR2. The present differential pressure PBG is a differential pressure between the atmospheric pressure PA at the present time point and the intake pipe absolute pressure PBA at the present time point.

Then, it is determined in a step S88 whether or not a EGR execution determination flag F_EGR assumes "1". If the answer to the question is negative (NO), i.e. if the engine 1 is not in an operating region for executing the exhaust gas recirculation control, the present value KEGR(n) of the EGR-dependent correction coefficient is set to 1.0 in a step S89. On the other hand, if the engine 1 is in the operating region for executing the exhaust gas recirculation control, it is determined in a step S90 whether or not the actual lift amount LACT is larger than a predetermined value #LACTFG. If LACT≦#LACTFG holds, it is judged that the EGR rate is extremely small, which means the correction of the fuel injection time period TOUT by the EGR-dependent correction coefficient KEGR is not required, the step S89 is executed to set the present value KEGR(n) to 1.0.

Figure 15:
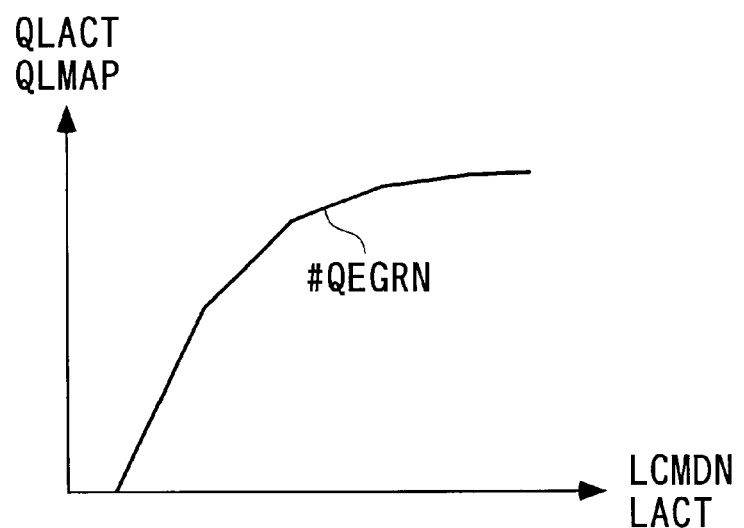
FIG. 15 shows an example of a #QEGRN table.

If LACT>#LACTFG holds in the step S90, the program proceeds to a step S91, wherein a value retrieved from a #QEGRN table shown in FIG. 15 according to the basic command value LCMDN of the lift amount command value LCMD retrieved in the step S71 in FIG. 7 is set to a converted EGR rate QLMAP corresponding to the basic command value LCMDN. The #QEGRN table is for converting the lift amount of the EGR valve 13 to the EGR rate and set according to lift amount-flow rate characteristics of the EGR valve 13. In the present example, the relationship between the lift amount and the flow rate is non-linear.

In the following step S92, similarly to the step S91, a value retrieved from the FIG. 15 #QEGRN table according to the actual lift amount command value LACT is set to a converted EGR rate QLACT corresponding to the actual lift amount command value LACT.

Then, the program proceeds to a step S93, wherein the EGR-dependent correction coefficient KEGR is calculated based on the map value KEGRMAP set in the step S73 or S74 in FIG. 7, the lowland and present EGR rate-dependent coefficients KQEGR1, KQEGR2 set at the respective steps S86, S87, and the converted EGR rates QLMAP, QLACT set at the respective steps S91, S92, by using the following equation (7):

$$KEGR = 1.0 - (1.0 - KEGRMAP) \times (QLACT/QLMAP) \times \\ (KQEGR2/KQEGR1) \times KCMDT \quad (7)$$

The equation (7) is formulated based on the following intent: As described above, the map value KEGRMAP of the EGR-dependent correction coefficient KEGR is set assuming that the engine 1 operating on a lowland and in the steady state. The term QLACT/QLMAP in the equation (7) represents the ratio of the converted EGR rate corresponding to the actual lift amount LACT to the converted EGR rate corresponding to the basic command value LCMDN, and hence indicates delay in operation of the EGR valve 13 in response to a command from the ECU 5, in a transitional state of the EGR valve 13. Therefore, the use of the converted flow ratio QLACT/QLMAP in the equation (7) makes it possible to eliminate the influence of the delay in operation of the EGR valve 13.

For instance, if the operation delay of the EGR valve 13 is large when it is opened, the amount of fresh intake air tends to increase due to delay in change in the actual lift amount LACT and resultant lag in supply of recirculated exhaust gases. However, according to the equation (7), since the EGR-dependent correction coefficient KEGR is calculated as a larger value by using a smaller QLACT value, the fuel injection time period TOUT is increased (i.e. the fuel injection amount is increased), which makes it possible to prevent the air-fuel mixture from being leaned due to the increase in the amount of fresh intake air, thereby properly controlling the air-fuel ratio. In this connection, it is possible to employ LACT/LCMDN as a parameter indicative of delay in operation of the EGR valve 13, but since the relationship between the lift amount of the EGR valve 13 and the EGR flow rate is not necessarily linear as shown in the FIG. 15 #QEGRN table, the use of the converted flow ratio QLACT/QLMAP is preferable to the use of LACT/LCMDN for appropriate compensation for the delay in operation of the EGR valve 13.

Similarly, KQEGR2/KQEGR1 represents the ratio of the EGR rate-dependent coefficient corresponding to the present differential pressure PBG to the EGR rate-dependent corresponding to the differential pressure PBG on a lowland, i.e. the ratio of EGR flow rates, and hence the use of KQEGR2/KQEGR1 makes it possible to eliminate the influence of variations in the atmospheric pressure.

In a step S94 following the step S93, it is determined whether or not the present value KEGR(n) of the EGR-dependent correction coefficient calculated as above is smaller than the map value KEGRMAP. If the answer to the question is affirmative (YES), i.e. if KEGR(n)<KEGRMAP holds, the present value KEGR(n) is set to the map value KEGRMAP in a step S95, whereas if the answer to the question is negative (NO), the program immediately proceeds to a step S96.

In the step S96, the EGR-dependent correction coefficient KEGR for use in the present loop is set to a value KEGR(n-#T) calculated #T (TDC) times before, so as to compensate for a time delay which occurs between the opening of the EGR valve 13 and a time point that recirculated exhaust gases actually reach the combustion chamber 1c after flowing through the EGR valve 13, the EGR pipe 12 downstream of the EGR valve 13, and the intake pipe 2. The value of #T is determined e.g. through experiments. Thus, it is possible to appropriately apply the EGR-dependent correction coefficient KEGR to the above equation (1) while compensating for the delay in the exhaust gas recirculation.

Figure 16:
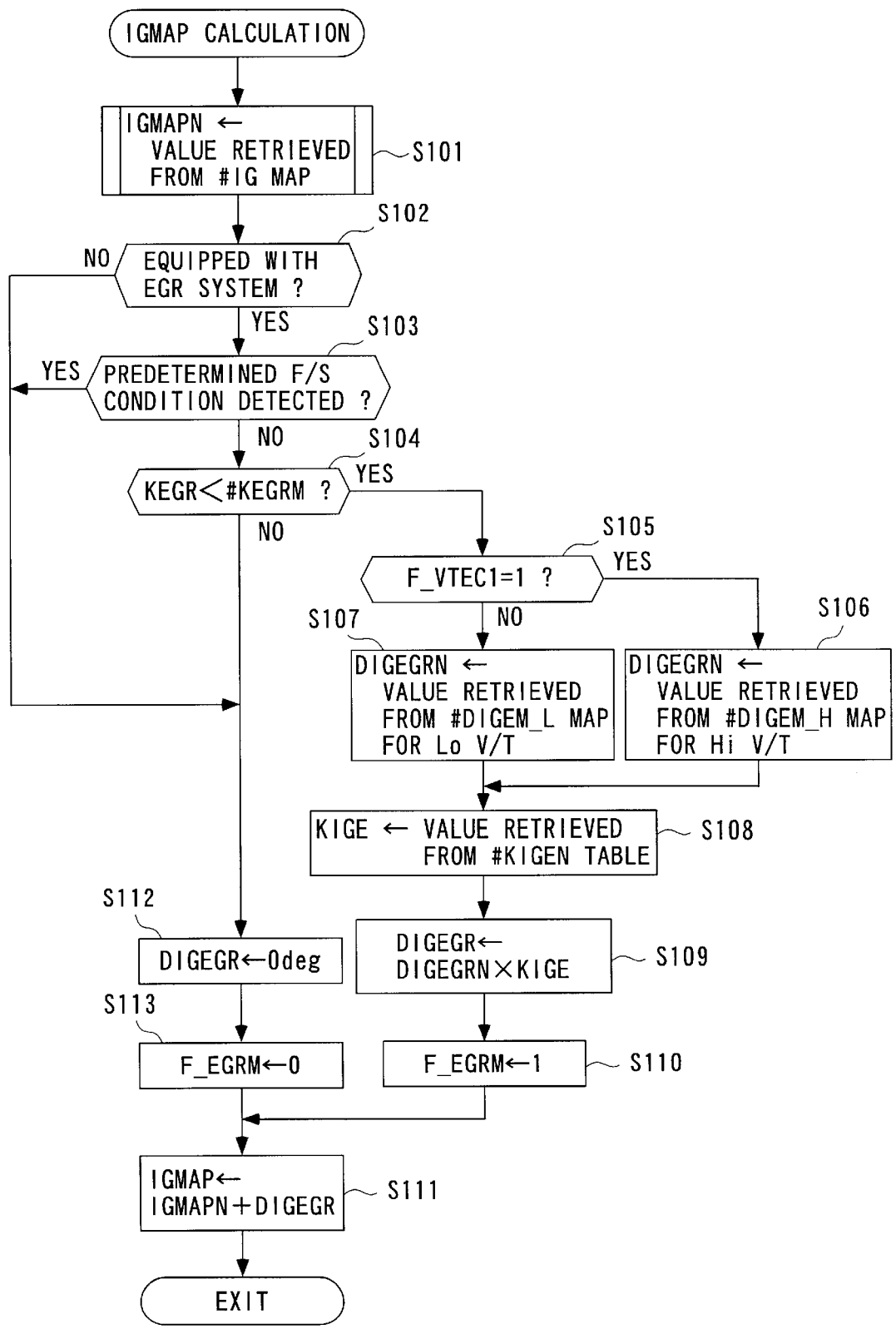
FIG. 16 is a flowchart showing a subroutine for calculating a basic ignition timing IGMAP.

FIG. 16 shows a subroutine for calculating the basic ignition timing IGMAP of the ignition timing IGLOG used in the equation (2). In the process, first in a step S101, a value retrieved from an IG map, not shown, according to the engine rotational speed NE and the intake pipe absolute pressure PBA is set to a basic map value IGMAPN.

Then, it is determined in a step S102 whether or not the engine 1 is of a type having an exhaust gas recirculation system. If the engine 1 has the exhaust gas recirculation system, it is determined in a step S103 whether or not a predetermined fail-safe condition has been detected. If the answer to the question is negative (NO), it is determined in a step S104 whether or not the EGR-dependent correction coefficient KEGR is smaller than a predetermined value #KEGRM. The EGR-dependent correction coefficient KEGR which is used in the present process is the value KEGR(n-#T) calculated #T (TDC) times before, which has been set e.g. in the step S96 in FIG. 13. If the answer to the question of the step S104 is affirmative (YES), i.e. if KEGR<#KEGRM holds, it is judged that the EGR rate is maintained at a certain level, and the program proceeds to steps S105 et seq., wherein an EGR-dependent correction term DIGEGR for correcting the basic map value IGMAPN is calculated.

First, in the step S105, it is determined whether or not the VTEC flag F_VTEC1 assumes "1". If the answer to the question is affirmative (YES), i.e. if the valve timing has been set to Hi V/T, a value retrieved from a #DIGEM_H map for Hi V/T, not shown, according to the engine rotational speed NE and the intake pipe absolute pressure PBA is set to a map value DIGEGRN of the EGR-dependent correction term DIGEGR in a step S106. On the other hand, if the answer to the question of the step S105 is negative (NO), i.e. if the valve timing has been set to Lo V/T, a value retrieved similarly to the step S106 from a #DIGEM_L map for Lo V/T, not shown, which is set separately from the #DIGEM map for Hi V/T, is set to the map value DIGEGRN in a step S107.

Figure 17:
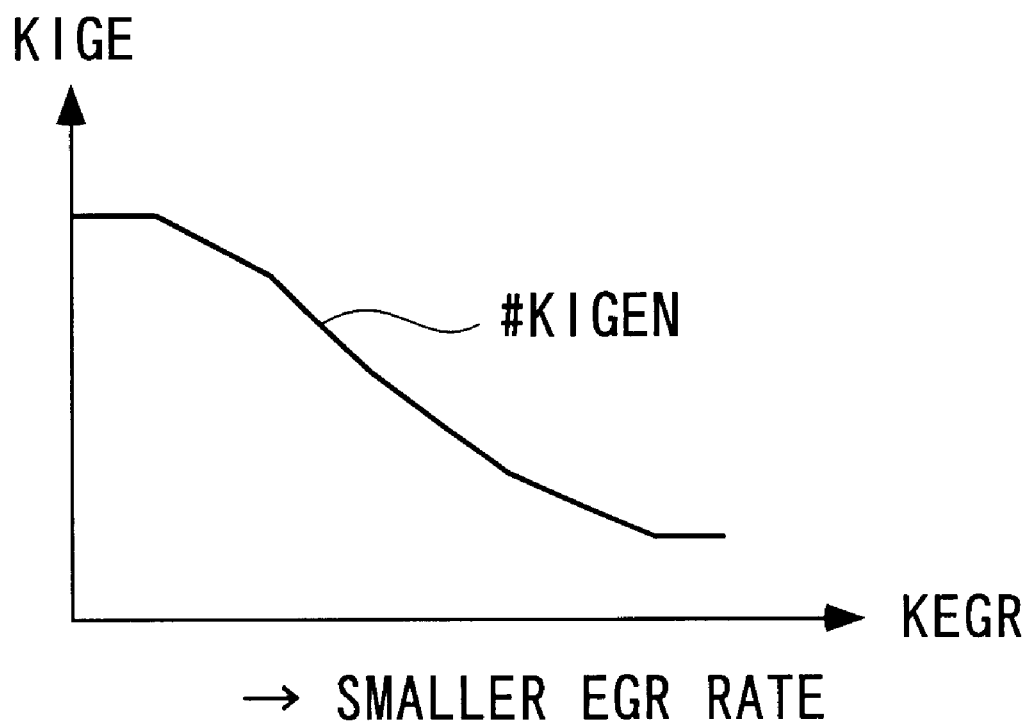
FIG. 17 shows an example of a #KIGEN table.

In the following step S108, a value retrieved from a #KIGEN table shown in FIG. 17 according to the EGR-dependent correction coefficient KEGR is set to a correction coefficient KIGE. The #KIGEN table is set such that as the EGR-dependent correction coefficient KEGR is larger, i.e. as the EGR rate is smaller, the correction coefficient KIGE becomes smaller.

Then, the program proceeds to a step S109, wherein the EGR-dependent correction term DIGEGR is calculated by multiplying the map value DIGEGRN set in the step S106 or S107 by the correction coefficient KIGE by using the following equation (8):

$$DIGEGR = DIGEGRN \times KIGE \quad (8)$$

Then, an ignition timing correction flag F_EGRM is set to "1" in a step S110, and at the following step S111, the basic ignition timing IGMAP is calculated by adding the EGR-dependent correction term DIGEGR to the basic map value IGMAPN obtained in the step S101, by using the following equation (9):

$$IGMAP = IGMAPN + DIGEGR \quad (9)$$

followed by terminating the program.

As described above, according to the FIG. 16 process, the EGR-dependent correction term DIGEGR is used as an addend term for use in calculating the basic ignition timing IGMAP, and since the correction coefficient KIGE for correcting the EGR-dependent correction term DIGEGR is calculated as above, the EGR-dependent correction term DIGEGR is set to a smaller value, i.e. in a retarding direction, as the EGR-dependent correction coefficient KEGR is larger. Accordingly, e.g. when the EGR rate is small, as the EGR-dependent correction coefficient KEGR is set to a larger value, the ignition timing IGLOG is retarded. Similarly, e.g. when delay in operation of the EGR valve 13 is large in opening the same, the EGR-dependent correction coefficient KEGR is set to a larger value as described above, and hence the ignition timing IGLOG can be retarded according to the larger value of the EGR-dependent correction coefficient KEGR, which makes it possible to prevent NOx from being generated in an increased amount due to the delay in operation of the EGR valve 13 at the time of opening the same, thereby improving exhaust emission characteristics.

If it is determined in the steps S102 to S104 that the engine 1 is not provided with an exhaust gas recirculation system, that the predetermined fail-safe condition has been detected, or that KEGR(n)≧KEGRMAP holds, and hence the EGR rate is extremely small, the EGR-dependent correction term DIGEGR is set to 0 (degrees) in a step S112, and the ignition timing correction flag F_EGRM is set to "0" in a step S113, and then the step S111 is executed, followed by terminating the program. In short, in these cases, correction by the EGR-dependent correction term DIGEGR is not carried out.

It is further understood by those skilled in the art that the foregoing is a preferred embodiment of the invention, and that various changes and modifications may be made without departing from the spirit and scope thereof.

What is claimed is:

1. A control system for an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve, the control system comprising:
fuel supply cut-off means for cutting off supply of fuel to the engine during deceleration of the engine;
pressure-detecting means for detecting pressure within the intake passage; and
operation amount-limiting means for setting an upper limit of the operation amount of the exhaust gas recirculation valve according to a change in the pressure within the intake passage detected when the exhaust gas recirculation valve is opened and closed during the cut-off of fuel supply.

2. A control system according to claim 1, further comprising flow rate degradation-estimating means for estimating a degree of flow rate degradation of the exhaust gas recirculation system based on the change in the pressure within the intake passage detected when the exhaust gas recirculation valve is opened and closed during the cut-off of fuel supply, and
wherein the operation amount-limiting means sets the upper limit of the operation amount of the exhaust gas recirculation valve according to the estimated degree of flow rate degradation of the exhaust gas recirculation system.

3. A control system according to claim 1 or 2, further comprising operation delay-detecting means for detecting delay in operation of the exhaust gas recirculation valve, and
fuel amount-correcting means for correcting an amount of fuel to be supplied to the engine when the exhaust gas recirculation valve is opened such that the amount of fuel is increased as the detected delay in operation of the exhaust gas recirculation valve is larger.

4. A control system according to claim 1 or 2, further comprising operation delay-detecting means for detecting delay in operation of the exhaust gas recirculation valve, and
ignition timing-correcting means for correcting ignition timing of the engine when the exhaust gas recirculation valve is opened such that the ignition timing is retarded as the detected delay in operation of the exhaust gas recirculation valve is larger.

5. A control system for an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve, the control system comprising:
a fuel supply cut-off module for cutting off supply of fuel to the engine during deceleration of the engine;
a pressure-detecting module for detecting pressure within the intake passage; and
an operation amount-limiting module for setting an upper limit of the operation amount of the exhaust gas recirculation valve according to a change in the pressure within the intake passage detected when the exhaust gas recirculation valve is opened and closed during the cut-off of fuel supply.

6. A control system according to claim 5, further comprising a flow rate degradation-estimating module for estimating a degree of flow rate degradation of the exhaust gas recirculation system based on the change in the pressure within the intake passage detected when the exhaust gas recirculation valve is opened and closed during the cut-off of fuel supply, and
wherein the operation amount-limiting module sets the upper limit of the operation amount of the exhaust gas recirculation valve according to the estimated degree of flow rate degradation of the exhaust gas recirculation system.

7. A control system according to claim 5 or 6, further comprising a operation delay-detecting module for detecting delay in operation of the exhaust gas recirculation valve, and
a fuel amount-correcting module for correcting an amount of fuel to be supplied to the engine when the exhaust gas recirculation valve is opened such that the amount of fuel is increased as the detected delay in operation of the exhaust gas recirculation valve is larger.

8. A control system according to claim 5 or 6, further comprising an operation delay-detecting module for detecting delay in operation of the exhaust gas recirculation valve, and
an ignition timing-correcting module for correcting ignition timing of the engine when the exhaust gas recirculation valve is opened such that the ignition timing is retarded as the detected delay in operation of the exhaust gas recirculation valve is larger.

9. A method of controlling an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve, the method comprising the steps of:

cutting off supply of fuel to the engine during deceleration of the engine;

detecting pressure within the intake passage when the exhaust gas recirculation valve is opened and closed during the cut-off of fuel supply; and setting an upper limit of the operation amount of the exhaust gas recirculation valve according to a change in the pressure within the intake passage detected when the exhaust gas recirculation valve is opened and closed during the cut-off of fuel supply.

10. A method according to claim 9, further comprising the step of estimating a degree of flow rate degradation of the exhaust gas recirculation system based on the change in the pressure within the intake passage detected when the exhaust gas recirculation valve is opened and closed during the cut-off of fuel supply, and wherein the step of setting an upper limit of the operation amount of the exhaust gas recirculation valve includes setting the upper limit according to the estimated degree of flow rate degradation of the exhaust gas recirculation system.

11. A method according to claim 9 or 10, further comprising the step of detecting delay in operation of the exhaust gas recirculation valve, and the step of correcting an amount of fuel to be supplied to the engine when the exhaust gas recirculation valve is opened such that the amount of fuel is increased as the detected delay in operation of the exhaust gas recirculation valve is larger.

12. A method according to claim 9 or 10, further comprising the step of detecting delay in operation of the exhaust gas recirculation valve, and the step of correcting ignition timing of the engine when the exhaust gas recirculation valve is opened such that the ignition timing is retarded as the detected delay in operation of the exhaust gas recirculation valve is larger.

13. An engine control unit including a control program for causing a computer to carry out control of an internal combustion engine having an exhaust gas recirculation system including an exhaust gas recirculation passage for communicating between an exhaust passage and an intake passage, and an exhaust gas recirculation valve for controlling a rate of exhaust gas recirculation to the intake passage via the exhaust gas recirculation passage, according to an operation amount of the exhaust gas recirculation valve, wherein the control program causes the computer to cut off supply of fuel to the engine during deceleration of the engine, detect pressure within the intake passage when the exhaust gas recirculation valve is opened and closed during the cut-off of fuel supply, and set an upper limit of the operation amount of the exhaust gas recirculation valve according to a change in the pressure within the intake passage detected when the exhaust gas recirculation valve is opened and closed during the cut-off of fuel supply.

14. An engine control unit according to claim 13, wherein the control program further causes the computer to estimate a degree of flow rate degradation of the exhaust gas recirculation system based on the change in the pressure within the intake passage detected when the exhaust gas recirculation valve is opened and closed during the cut-off of fuel supply, and when the control program causes the computer to set an upper limit of the operation amount of the exhaust gas recirculation valve, the control program causes the computer to set the upper limit according to the estimated degree of flow rate degradation of the exhaust gas recirculation system.

15. An engine control unit according to claim 13 or 14, wherein the control program further causes the computer to detect delay in operation of the exhaust gas recirculation valve, and correct an amount of fuel to be supplied to the engine when the exhaust gas recirculation valve is opened such that the amount of fuel is increased as the detected delay in operation of the exhaust gas recirculation valve is larger.

16. An engine control unit according to claim 13 or 14, wherein the control program further causes the computer to detect delay in operation of the exhaust gas recirculation valve, and correct ignition timing of the engine when the exhaust gas recirculation valve is opened such that the ignition timing is retarded as the detected delay in operation of the exhaust gas recirculation valve is larger.

* * * * *